(12) United States Patent
Miya

(10) Patent No.: US 6,959,070 B2
(45) Date of Patent: Oct. 25, 2005

(54) RADIO BASE STATION APPARATUS AND RADIO COMMUNICATION METHOD

(75) Inventor: Kazuyuki Miya, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 642 days.

(21) Appl. No.: 09/936,729

(22) PCT Filed: Dec. 26, 2000

(86) PCT No.: PCT/JP00/09261

§ 371 (c)(1),
(2), (4) Date: Sep. 17, 2001

(87) PCT Pub. No.: WO01/54307

PCT Pub. Date: Jul. 26, 2001

(65) Prior Publication Data

US 2003/0068993 A1 Apr. 10, 2003

(30) Foreign Application Priority Data

Jan. 19, 2000 (JP) .............................. 2000-010879

(51) Int. Cl.$^7$ .......................... H04M 1/64; H04M 3/42
(52) U.S. Cl. ............. 379/67.1; 379/88.07; 379/201.06; 379/201.08; 379/201.1; 379/207.12; 379/88.21
(58) Field of Search ................................ 375/148, 130, 375/260, 269, 270; 342/145, 189, 367, 378, 342/380; 455/226.1, 226.2, 295, 296; 379/67.1, 379/88.07, 201.06, 201.08, 201.1, 207.12

(56) References Cited

U.S. PATENT DOCUMENTS 6,061,553 A 5/2000 Matsuoka, et al.

6,064,338 A * 5/2000 Kobayakawa et al. ...... 342/378
6,385,185 B1 * 5/2002 Huang ......................... 370/342
6,526,271 B1 * 2/2003 Uesugi et al. ............... 455/296

FOREIGN PATENT DOCUMENTS

| JP | 11266180 | 9/1999 |
| JP | 2000307489 | 11/2000 |
| JP | 2001036451 | 2/2001 |

OTHER PUBLICATIONS

Akio Aoyama, et al., "CDMA Path-search Sheme Using Combined Delay Profile of Diversity Antennas", Technical Report of IEICE, SSE99-43, RCS99-67(Jul. 1999), pp. 25-30, with English Abstract.

* cited by examiner

Primary Examiner—Allan Hoosain
(74) Attorney, Agent, or Firm—Stevens, Davis, Miller & Mosher, LLP

(57) ABSTRACT

A path search processing section 110 of a searcher 108 performs despreading processing for a signal that has undergone AAA reception by an MF 110a. A power addition circuit 110c adds power of a signal in which coherent addition of a despread signal has been performed, and outputs the result to a delay profile circuit 110d and also to threshold value decision circuit 111. Outputs from respective threshold value decision circuits 111 are output to a combining circuit 112. A power combination value combined by the combining circuit 112 is output to a delay profile circuit 113, and a delay profile is created based on this power combination value. A finger assignment circuit 114 finds despreading timing for AAA reception weight control from the delay profile.

5 Claims, 4 Drawing Sheets

RADIO BASE STATION APPARATUS AND RADIO COMMUNICATION METHOD

TECHNICAL FIELD

The present invention relates to a radio base station apparatus and radio communication method for use in a digital radio communication system, and relates in particular to a base station apparatus provided with a high-precision path search processing section and its radio communication method.

BACKGROUND ART

Conventionally, when finger assignment for RAKE reception is performed by a path search processing section in a DS-CDMA (Direct Sequence-Code Division Multiple Access) system, a nondirectional state delay profile is created using a nondirectional received signal.

The path search processing section in a conventional radio base station apparatus will be described using FIG. 1. FIG. 1 is a block diagram showing the configuration of a convention 1 radio base station apparatus.

Uplink signals received via antennas 1 are input respectively to RF circuits 2. In the RF circuits 2, the received signals are down-converted. The down-converted signals undergo A/D conversion by an A/D converter not shown in the drawing, and become baseband signals. These baseband signals undergo despreading processing by matched filters (MF) 3, and are then output to an adaptive array antenna (hereinafter abbreviated to "AAA") reception circuit 4. In the AAA reception circuit 4, the despread signals are multiplied by a predetermined reception weight, and undergo AAA reception processing. A signal on which AAA reception processing has, been performed is sent to a demodulation circuit 5, undergoes demodulation processing, and becomes receive data.

In addition, the output of an RF circuit 2 is sent to a matched filter 6, and after despreading processing, is sent to a delay profile circuit 7. The delay profile circuit 7 creates a delay profile using the despread signal, and outputs the result to a path search processing section 8. The path search processing section performs finger assignment based on the delay profile, and detects the despreading timing for AAA reception processing. This despreading timing is output to the matched filter 3.

In the above-described method, transmission power control is performed on the premise that the SIR (Signal to Interference Ratio) is improved by AAA reception, and a nondirectional received signal (signal prior to AAA reception processing) is used for finger assignment. However, when a nondirectional received signal is used, the SIR deteriorates greatly and accurate finger assignment is not possible with a delay profile based thereon. There is consequently a problem of deterioration of demodulation capability, and as a result, high reception power is necessary to perform correct finger assignment, and adjustment is carried out by means of transmission power control. This means that, despite the use of a reception AAA, it is not possible to achieve SIR improvement effects due to its directional control.

DISCLOSURE OF INVENTION

It is an objective of the present invention to provide a radio base station apparatus and radio communication method provided with a path search processing section that makes possible accurate finger assignment without the need for high reception power.

The theme of the present invention is exploiting the effects of a reception AAA and making possible accurate finger assignment without requiring high reception power by performing AAA reception of individual physical channels by means of grouped weighting, combining power addition values for each directional pattern to create a delay profile, and obtaining despreading timing for reception AAA weight control or despreading timing for demodulation from this delay profile.

Also, in the present invention, when a plurality of channels (users) are grouped using an uplink signal and a path search is conducted only by means of an AAA reception signal according to a weight that is common within the same group (grouped weight), the probability of missing a reception path that appears outside a directivity formation range (nondetection probability) increases, and it becomes difficult to follow directivity that changes due to movement of a communication terminal (toward a neighboring group) that is, to respond to group switching. By contrast, by creating a nondirectional state delay profile from a signal that has a high SIR after AAA reception, it is possible to reduce the reception path nondetection probability and respond to movement of a communication terminal.

BEST MODE FOR CARRYING OUT THE INVENTION

With reference now to the attached drawings, embodiments of the present invention will be explained in detail below.

(Embodiment 1)

In this embodiment, a case is described in which a delay profile is created using a power addition value for each directional pattern of received signals subjected to AAA reception processing using a grouped weight, and despreading timing for reception AAA weight control is obtained (a path search is performed) using that delay profile. In this embodiment, in order to simplify the explanation, a case is described in which the number of antennas for AAA reception is 3, the number of groups (n) when grouping a plurality of channels and the number of directional patterns is 2, and the number of channels (k) is also 2.

Figure 1:
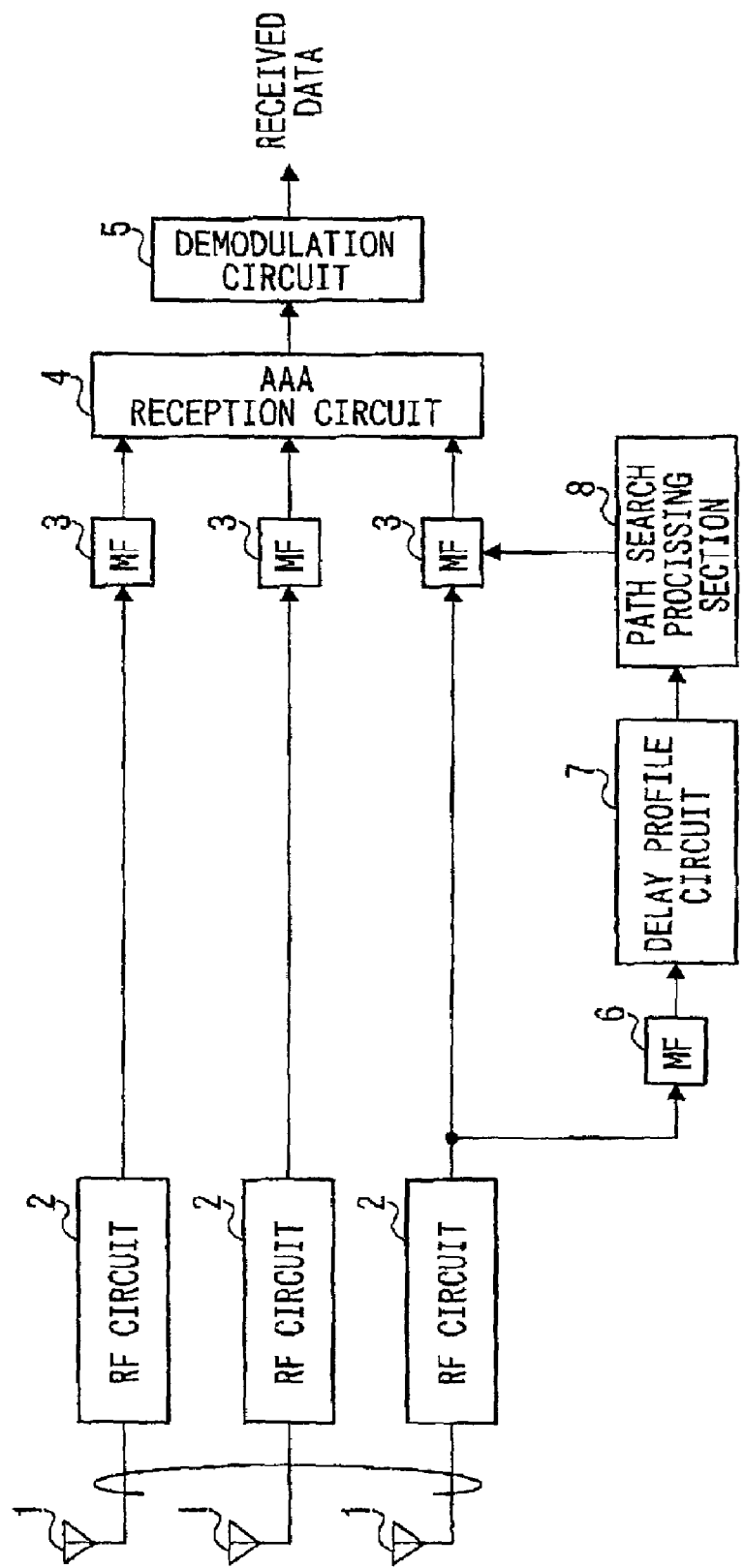
FIG. 1 is a block diagram showing the configuration of a conventional radio base station apparatus.
Figure 2:
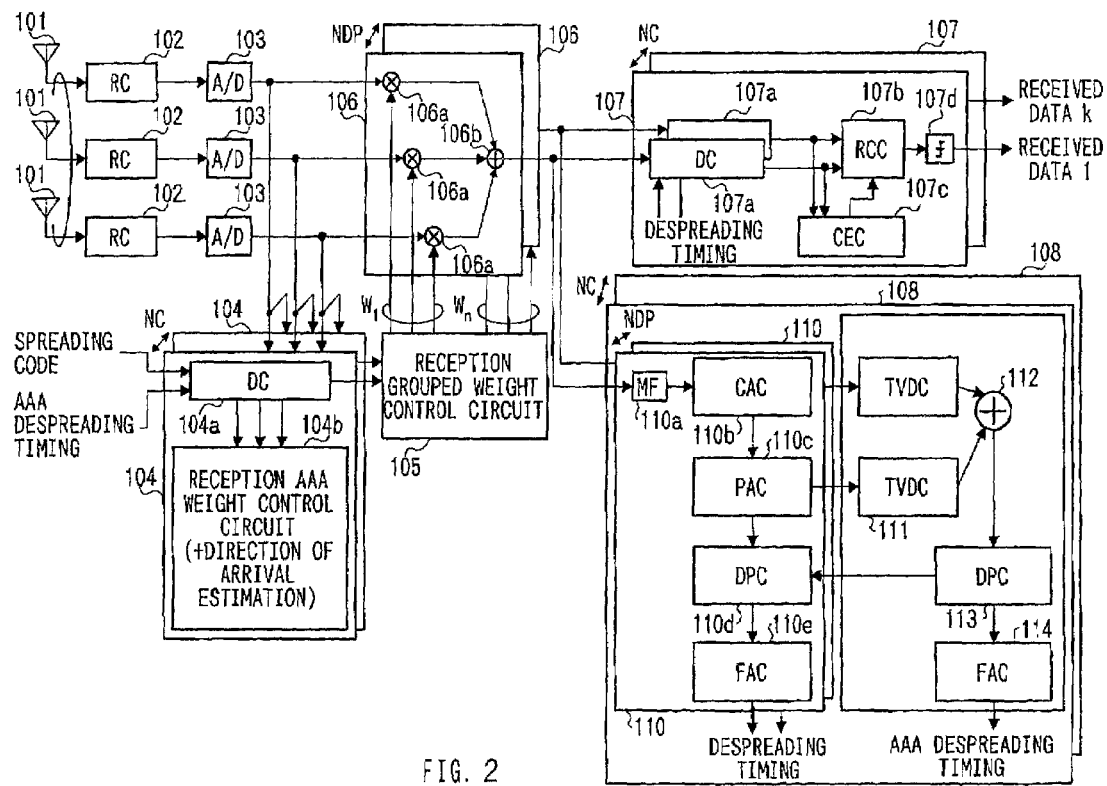
FIG. 2 is a block diagram showing the configuration of a radio base station apparatus according to Embodiment 1 of the present invention.

FIG. 2 s a block diagram showing the configuration of a radio base station apparatus according to Embodiment 1 of the present invention.

Uplink signals received via antennas 101 are input respectively to RP circuits 102. In the RF circuits 102, the receive signals are down-converted. The down-converted signals undergo A/D conversion by A/D converters 103, and become baseband signals.

These baseband signals are sent to a reception weight control sect ion 104, and are also sent to a reception directivity control circuit 106. Here, the number of reception directivity control circuits 106 provided (two) is equivalent to the number of directional patterns corresponding to the number of groups when a plurality of channels are grouped. Also, the number of reception weight control sections 104 provided (two) is equivalent to the number of channels (the number of users).

In the reception weight control section 104, despreading processing is performed by a despreading circuit 104a for the signal from the respective antenna element using a predetermined spreading code (the spreading code used in spreading modulation processing on the communication terminal side), and the despread signal is sent to a reception AAA weight control circuit 104b.

In the reception AAA weight control circuit 104b, the direction of arrival of each channel (user) is first estimated. Based on the result of this direction of arrival estimation, channel grouping is performed. The grouping result is sent to a reception grouped weight control circuit 105. In the reception grouped weight control circuit 105, a reception grouped weight is calculated for each group. The reception grouped weights (W1 to Wn) are sent to the reception directivity control circuit 106.

The reception directivity control circuit 106 performs reception AAA processing for a received signal using the reception grouped weight for each group found by the reception grouped weight control circuit 105, and outputs a signal that has undergone reception AAA processing to a demodulation circuit 107 and path search processing section 108 for each reception directional pattern. The number of demodulation circuits 107 and path search processing sections 108 provided is equivalent to the number of channels (here, two).

In the demodulation circuit 107, despreading processing and RAKE combination processing are carried out on a signal that has undergone reception AAA processing, and receive data l and receive data k (number of channels: here, two) are obtained.

In the path search processing section 108, a delay profile is created by the post-combination path search processing section 110 based on signals of each reception directional pattern, finger assignment is performed based on that delay profile, and despreading timing is output, and in addition, AAA despreading timing is output using a power addition value obtained by the post-combination path search processing section 110.

The operation of a radio base station apparatus with the above configuration will now be described.

In a radio base station apparatus according to this embodiment, grouping is performed among a plurality of channels (users) using uplink signals, and a directional pattern is used that is formed using a weight that is common within the same group (grouped weight). To be specific, the reception AAA weight control circuit 104b of the reception weight control section 104 estimates the direction of arrival from a signal from each communication terminal of an individual physical channel, and classifies (groups) communication terminals into a plurality of groups based on the respective directions of arrival, and the reception grouped weight control circuit 105 calculates a reception grouped weight for each of these groups.

Figure 3:
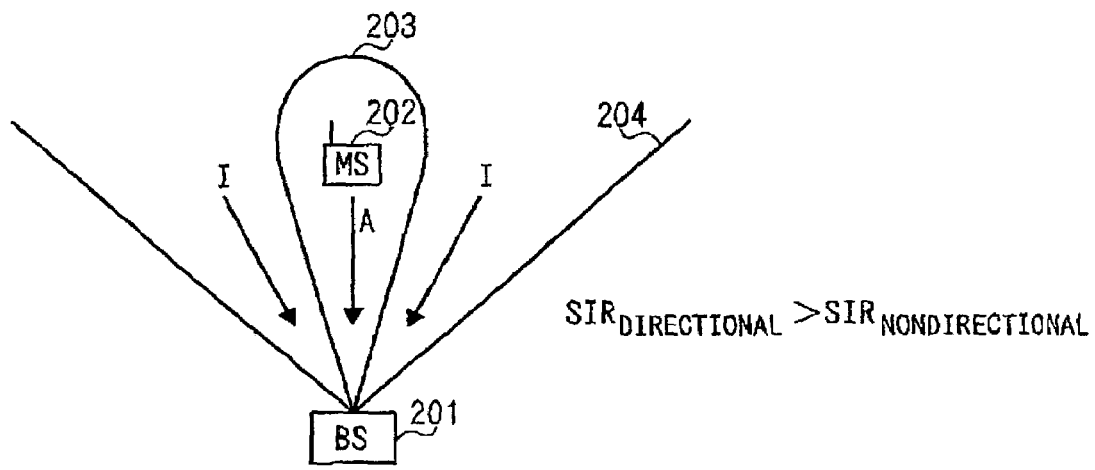
FIG. 3 as a drawing for explaining a case where directional reception is performed.

By this means, as shown in FIG. 3, a base station apparatus 201 performs AAA reception with the same grouped weight for communication terminals existing in a grouped directional pattern 203 in a sector 204. As a result, with regard to the SIR when AAA reception is performed, desired signal path A can mainly be received, and reception of interference signals I is suppressed, further increasing the SIR in the case of nondirectional reception.

Also, by using this kind of grouped weight, the number of reception direction patterns can be kept small, enabling the amount of control for calculating reception weights to be reduced.

A signal transmitted from a communication terminal is received via an antenna 101, and after being down-converted by an RF circuit 102, in converted to a digital signal by an A/D converter 103 and becomes a baseband signal. This baseband signal is multiplied by a multiplier 106a of the reception directivity control circuit 106 by grouped weights W1, Wn (n: number of groups) obtained by the reception grouped weight control circuit 105. The signals multiplied by these grouped weights are added by an adder 106b. The number of multipliers 106a provided is equivalent to the number of antennas (here, three). In this way, the signal transmitted from each communication terminal is subjected to AAA reception with the reception directional pattern of each group formed by means of grouped weights.

This signal having undergone AAA reception is sent to the path search processing section 108. In the path search processing section 108, path search processing is carried out by the post-combination path search processing section 110 for each directional pattern. In this post-combination path search processing section 110, despreading processing is first performed by a matched filter (MF) 110a for a signal that has undergone AAA reception using a predetermined spreading code (the spreading code used in spreading modulation processing on the communication terminal side). For this spreading code, one of the spreading codes used by communication terminals included in a grouped plurality of directional patterns may, for example, be input as a representative code.

The despread signal resulting from this despreading processing is sent to a coherent addition circuit 110b. The coherent addition circuit 110b performs coherent addition of the despread signal and outputs the result to a power addition circuit 110c. The power addition circuit 110c adds the in-phase-added signal power (level) and outputs the result to a delay profile circuit 110d and also to a threshold value decision circuit 111.

The delay profile circuit 110d creates a delay profile based on the power addition value found by the power addition circuit 110c. This delay profile information is sent to a finger assignment circuit 110e. The finger assignment circuit 110e performs finger assignment using the delay profile information. At this time, despreading timing is obtained.

The power addition value found by the power addition circuit 110c of the post-combination path search processing section 110 is sent to the threshold value decision circuit 111. The threshold value decision circuit 111 makes a threshold value decision for the power addition value using a predetermined threshold value. By making a threshold value decision for the power addition value in this way, it is possible to prevent the addition of unwanted noise and to suppress fading. This is because, since each power addition value is obtained from a different directional pattern, fading is independent for each.

A threshold value decision circuit 111 is provided for each directional pattern, and the outputs from the respective threshold value decision circuits 111 are output to a combining circuit 112. Therefore, power addition values with the unwanted noise component removed are output to the combining circuit 112, and only those power addition values are combined. By combining power addition values in this way, the path is made explicit in the delay profile, and it is possible to accurately detect the despreading timing for reception AAA weight control.

Figure 4:
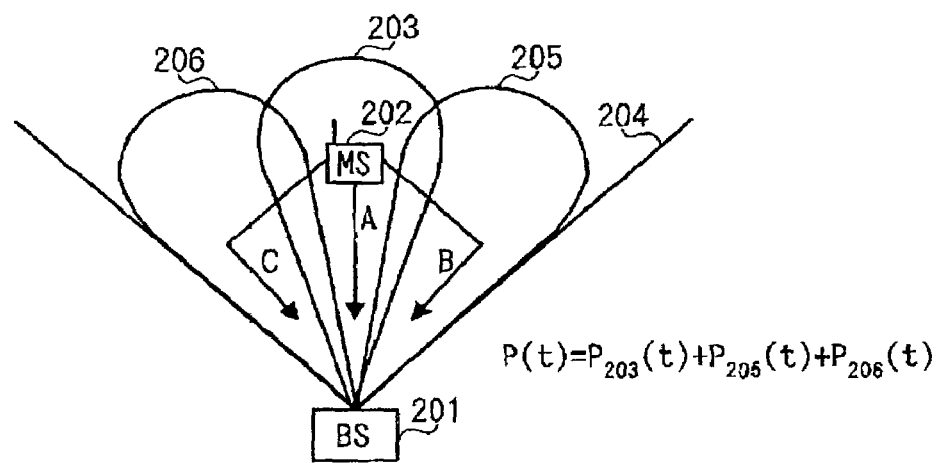
FIG. 4 is a drawing for explaining power combination after directional reception.

To be specific, as shown in FIG. 4, the combining circuit 112 combines directional pattern 203 delay profile A power addition value $P_{203}(t)$, directional pattern 205 delay profile B power addition value $P_{205}(t)$, and directional pattern 206 delay profile C power addition value $P_{206}(t)$ to find power combination value P(t). By combining directional pattern delay profiles in this way, it is possible to create a profile that covers the same area in the nondirectional state (sector 201). As a result, the probability of nondetection of a reception path, which is a risk with AAA reception, is reduced, and it is possible to handle communication terminal movement (to a neighboring group). In this case, despite the term non directional state delay profile, since AAA receiver signals are used for creation, the SIR is much better than in the case of a delay profile in normal nondirectional reception.

The power combination value combined by the combining circuit 112 is output to a delay profile circuit 113, and a delay profile is created based on this power combination value. The delay profile information is sent to a finger assignment circuit 114. The finger assignment circuit 114 finds the despreading timing for AAA reception weight control from the delay profile. This despreading timing is output to the despreading circuit 104*a* of the reception weight control section 104. The despreading circuit 104*a* performs despreading processing for signals received via the antenna elements using the despreading timing.

By performing despreading processing for signals received via each antenna element using accurate despreading timing in this way, and performing AAA reception processing using grouped weights as described above, it is possible to obtain a received signal that has a high SIR. Performing despreading processing using this received signal with a high SIR, performing coherent addition and power addition, and then creating a delay profile using power addition values and performing finger assignment from this delay profile, makes it possible to carry out a path search accurately.

Thus, with a radio base station apparatus according to this embodiment, a power combination value is found by combining the power addition values of each directional pattern, and finger assignment is performed using this power combination value, enabling a path search to be carried out accurately. By this means, the despreading timing used or reception AAA weight control can be found accurately, and it is possible to perform AAA reception processing accurately and receive received signals that have a high SIR. Also, since the effects of a reception AAA are exploited to obtain a signal that has a high SIR, and finger assignment is performed based on this signal, accurate finger assignment can be achieved without the need for high reception power.

In FIG. 4, when a path arrives from a part where two directional patterns overlap, the antenna gain due to the directional patterns is not sufficient in each independent path search. Therefore, it may not be possible for path detection to be carried out properly with the delay profile.

For finger assignment for demodulation in this case, it is necessary to decide whether the path assigned by the finger assignment circuit 114 is a signal of that directional pattern, and this decision is made based on delay profile information from the delay profile circuit 110*d* of the post-combination path search processing section 110.

At this time, since power addition values are combined by the combining circuit 112, a path with this timing has a large value, and can be selected as the object of finger assignment. Therefore, this delay profile information created by the delay profile circuit 113 is sent to the delay profile circuit 110*d* of the post-combination path search processing section 110, and the despreading timing of the despreading circuit 107*a* in the demodulation circuit 107 is detected from both sets of delay profile information.

By thus performing demodulation circuit 107 finger assignment and despreading timing detection using both delay profile information from the delay profile circuit 110*d* in the post-combination path search processing section 110 and delay profile information from the delay profile circuit 113, it is possible to handle cases where a path arrives from a part where two directional patterns overlap.

That is to say, if the level is high only in the delay profile of one directional pattern for which there is a path assigned by the finger assignment circuit 114, the despreading circuit 107*a* of the demodulation circuit 107 uses the despreading timing of the aforesaid path in that directional pattern, and it the level is high in a plurality of (for example, two) directional pattern delay profiles, the despreading circuit 107*a* of the demodulation circuit 107 uses the despreading timing of the aforesaid path in those two directional patterns. Whether a level is high or low is determined according to a threshold value, and that threshold value can be controlled according to the number of fingers or the environment.

(Embodiment 2)

In this embodiment, a case will be described in which this radio communication method is implemented in a radio base station apparatus that employs space diversity.

Figure 5:
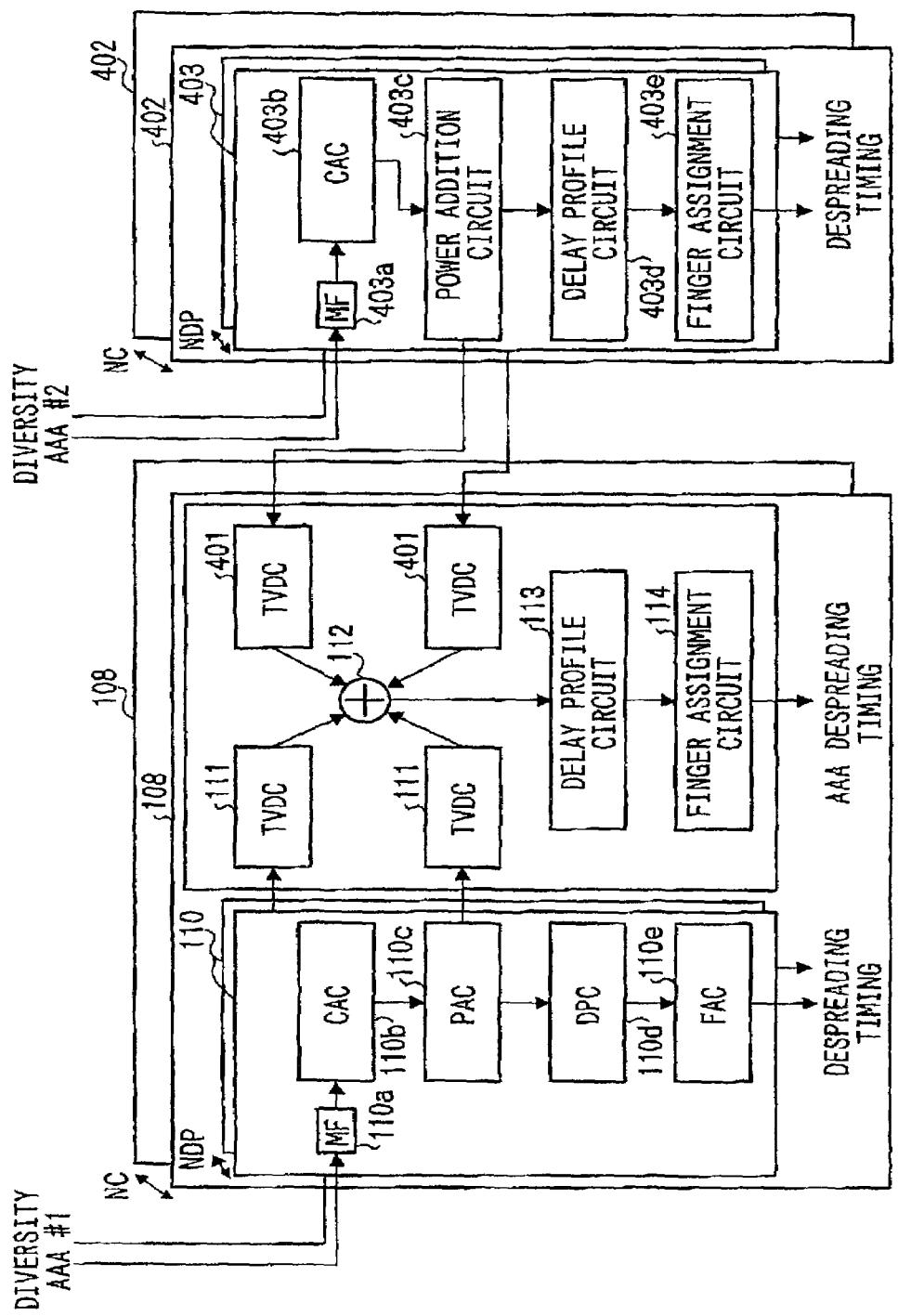
FIG. 5 s a block diagram showing part of the configuration of a radio base station apparatus according to Embodiment 2 of the present invention.

FIG. 5 is a block diagram showing part of the configuration of a radio base station apparatus according to Embodiment 2 of the present invention. Parts in FIG. 5 identical to those in FIG. 2 are assigned the same reference numerals as in FIG. 2 and their detailed explanations are omitted. Although adaptive array antennas are not shown in FIG. 5, this radio base station apparatus is provided with two adaptive array antennas as diversity antennas.

The radio base station apparatus shown in FIG. 5 has a number of path search processing sections 402, comprising a path search processing section 403 for each directional pattern, equivalent to the number of channels Therefore, this radio base station apparatus is provided with path search processing sections 108 for diversity AAA #1 and path search processing sections 402 for diversity AAA #2.

As with path search processing sections 108, each path search processing section 402 has a matched filter (MF) 403*a* that performs despreading processing for a signal received by diversity AAA #2 using a predetermined spreading code (the spreading code used in spreading modulation processing on the communication terminal side), a coherent addition circuit 403*b* that performs coherent addition of despread signals obtained by despreading processing, a power addition circuit 403*c* that adds the power of a signal after coherent addition, a power addition circuit 403*c* that adds the power of a signal after coherent addition, a delay profile circuit 403*d* that creates a delay profile using the power addition value from power addition, and a finger assignment circuit 403*e* that performs finger assignment based on delay profile information and detects despreading timing.

In a radio base station apparatus that has the above-described configuration, as in Embodiment 1, each path search processing section 108 and 402 performs despreading processing on a received signal, performs coherent addition and then power addition on the obtained despread signal, creates a delay profile using that power addition value, and detects despreading timing using this delay profile.

The power addition value found by power addition circuit 110c/403c of post-combination path search processing section 110/403 of the respective path search processing section 108/402 is sent to threshold value decision circuit 111/401 of the respective path search processing section 108. Threshold value decision circuit 111 makes a threshold value decision using a predetermine threshold value for the power addition value for a diversity AAA #1 received signal. Threshold value decision circuit 401 makes a threshold value decision using a predetermined threshold value for the power addition value for a diversity AAA #2 received signal.

The out puts from the respective threshold value decision circuits 111 are output to a combining circuit 112, and the outputs from the respective threshold value decision circuits 401 are output to a combining circuit 112. Therefore, power addition values with the unwanted noise component removed are output to the combining circuit 112, and only those power addition values are combined. By combining power addition values in this way, a high level can be used in delay profile, and it is possible to accurately detect the despreading timing for reception AAA weight control.

In this case, since reception weight control is performed independently for each diversity AAA, it may be thought that there will be no effect, but the characteristics of a reception AAA are greatly dependent on how path timing can be detected correctly in conditions of low SIR and nondirectivity. Therefore, the effect in terms of fading suppression is anticipated to be great.

Thus, in a radio base station apparatus according to this embodiment, it is possible to perform a path search accurately even when space diversity reception is used, since power addition values for each directional pattern are combined to find a power combination value, and finger assignment is performed using this power combination value. By this means, the despreading timing used in reception AAA weight control can be found accurately, and it is possible to perform AAA reception processing accurately and receive a received signal that has a high SIR. Also, since the effects of a reception AAA are exploited to obtain a signal that has a high SIR, and finger assignment is performed based on this signal, accurate finger assignment can be achieved without the need for high reception power.

In FIG. 5, the threshold value decision circuits 111 and 401, delay profile circuit 113, and finger assignment circuit 114 are provided in path search processing section 108, but these threshold value decision circuits 111 and 401, delay profile circuit 113, and finger assignment circuit 114 may be provided in path search processing section 402, or may be provided independently of path search processing sections 108 and 402.

As a communication terminal apparatus that performs radio communication with a radio base station apparatus according to Embodiment 1 or 2 can obtain a signal that has a high SIR by exploiting reception AAA effects on the radio base station apparatus side, it is possible to transmit transmission signals with comparatively low transmission power. As a result, it is possible to reduce interference with other stations in a system.

In above-described Embodiments 1 and 2, a case is described in which despreading timing detection processing is applied to a radio base station apparatus, but in the present invention, despreading timing detection processing may also be applied to a communication terminal apparatus. In this case, implementation would be possible, for example, by performing division into two directivities, finding the respective power addition values, combining these to create a delay profile, and performing a path search using this delay profile.

The present invention is not limited to above-described Embodiments 1 and 2, but can be implemented with various modifications. For example, in above-described Embodiments 1 and 2, a case is described in which the number of antennas is three, the number of channels (users) is two, and the number of groups when a plurality of users are grouped is two, but the present invention can be similarly applied to a case where the number of antennas, number of channels, and number of groups are other than these numbers.

A radio base station apparatus of the present invention employs a configuration comprising a reception weight setting section that sets a plurality of reception weights, an adaptive array antenna receiving section that performs adaptive array antenna reception of signals from an above-described plurality of communication terminals in directional patterns formed with the above-described reception weights, and a path search section that combines power addition values for each directional pattern received by an adaptive array antenna and creates a delay profile, performs finger assignment using this delay profile, and outputs despreading timing used in weight control for adaptive array antenna reception.

A radio base station apparatus of the present invention employs a configuration comprising a reception weight calculation section that groups a plurality of communication terminals and finds a reception weight for each group, an adaptive array antenna receiving section that performs adaptive array antenna reception of signals from an above-described plurality of communication terminals in directional patterns formed with the above-described reception weights, and a path search section that combines power addition values for each directional pattern received by an adaptive array antenna and creates a delay profile, performs finger assignment using this delay profile, and outputs despreading timing used in weight control for adaptive array antenna reception.

According to these configurations, since power addition values for each directional pattern are combined to create a delay profile, and finger assignment is performed using this delay profile, a path search can be carried out accurately. By this means, the despreading timing used n reception AAA weight control can be found accurately, and it is possible to perform AAA reception processing accurately and receive a received signal that has a high SIR.

A radio base station apparatus of the present invention employs a configuration comprising a plurality of diversity antennas, a reception weight calculation section that groups a plurality of communication terminals and finds a reception weight for each group, an adaptive array antenna receiving section that performs adaptive-array antenna reception respectively with the above-described diversity antennas of signals from an above-described plurality of communication terminals in directional patterns formed with the above-described reception weights, and a path search section that combines power addition values for each directional pattern that has undergone adaptive array antenna reception by an above-described diversity antenna and creates a delay profile, performs finger assignment using this delay profile, and outputs despreading timing used in weight control for adaptive array antenna reception.

According to this configuration, a path search can be carried out accurately even when performing diversity reception. By this means, the despreading timing used in reception AAA weight control can be found accurately, and it is possible to perform AAA reception processing accurately and receive a received signal that has a high SIR.

A radio base station apparatus of the present invention employs a configuration further comprising a threshold value decision section that makes a threshold value decision with respect to a power addition value in the above-described configuration, wherein the above-described path search section finds a power combination value from output after the above-described threshold value decision.

According to this configuration, by making a threshold value decision for a power addition value it is possible to prevent the addition of unwanted noise and to suppress fading.

A radio base station apparatus of the present invention employs a configuration wherein, in the above-described configuration, the path search section performs finger assignment using a signal received by an adaptive array antenna with a reception weight for each group found with the above-described despreading timing.

According to this configuration, since a signal that has a high SIR can be obtained by exploiting the effects of a reception AAA, and finger assignment is performed based on this signal, accurate finger assignment can be achieved without the need for high reception power.

A communication terminal apparatus of the present invention is characterized by performing radio communication with a radio base station apparatus with an above-described configuration. By this means, since a signal that has a high SIR can be obtained by exploiting the effects of a reception AAA on the radio base station apparatus side, on the communication terminal apparatus side it is possible to transmit transmission signals with comparatively low transmission power. As a result, it is possible to reduce interference with other stations in a system.

A radio communication method of the present invention comprises a reception weight calculating step of grouping a plurality of communication terminals and finding a reception weight for each group, an adaptive array antenna receiving step of performing adaptive array antenna reception of signals from an above-described plurality of communication terminals in directional patterns formed with the above-described reception weights, and a path search step of combining power addition values for each directional pattern received by an adaptive array antenna and creating a delay profile, performing finger assignment using this delay profile, and outputting despreading timing used in weight control for adaptive array antenna reception.

According to this method, since power addition values for each directional pattern are combined to create a delay profile, and finger assignment is performed using this delay profile, a path search can be carried out accurately. By this means, the despreading timing used in reception AAA weight control can be found accurately, and it is possible to perform AAA reception processing accurately and receive a received signal that has a high SIR.

A radio communication method of the present invention comprises a reception weight calculating step of grouping a plurality of communication terminals and finding a reception weight for each group, an adaptive array antenna receiving step of performing adaptive array antenna reception of signals from an above-described plurality of communication terminals in directional patterns formed with the above-described reception weights, a path search step of combining, after completion of threshold value decisions, power addition values for each group received by an adaptive array antenna and creating a d lay profile, performing finger assignment using this delay profile, and outputting despreading timing used in weight control for adaptive array antenna reception, and a finger assigning step of performing finger assignment using a signal received by an adaptive array antenna.

According to this method, a path search can be carried out accurately. By this means, the despreading timing used in reception AAA weight control can be found accurately, and it is possible to perform AAA reception processing accurately and receive a received signal that has a high SIR. Also, according to this method, by making a threshold value decision for a power addition value it is possible to prevent the addition of unwanted noise and to suppress fading. Moreover, according to this method, since a signal that has a high SIR can be obtained by exploiting the effects of a reception AAA, and finger assignment is performed based on this signal, accurate finger assignment can be achieved without the need for high reception power.

As described above, in a radio base station apparatus and radio communication method of the present invention, since power addition values for each directional pattern are combined to find a power combination value, and finger assignment is performed using this power combination value, a path search can be carried out accurately. By this means, the despreading timing used in reception AAA weight control can be found accurately, and it is possible to perform AAA reception processing accurately and receive a received signal that has a high SIR. Moreover, since a signal that has a high SIR is obtained by exploiting the effects of a reception AAA, and finger assignment is performed based on this signal, accurate finger assignment can be achieved without the need for high reception power.

This application is based on the Japanese Patent Application No. 2000-010879 filed on Jan. 19, 2000, entire content of which is expressly incorporated by reference herein.

INDUSTRIAL APPLICABILITY

The present invention can be applied to a radio base station apparatus and radio communication method used in a digital radio communication system.

What is claimed is:
1. A radio base station apparatus comprising:
   a reception weight calculator that performs a weight calculation to determine a plurality of reception weights;
   a reception direction control circuit that performs reception direction control of signals from a plurality of communication terminals using a plurality of directional patterns formed based on the plurality of reception weights; and
   a path searcher that combines power addition values respectively corresponding to the plurality of directional patterns of the signals received from the reception direction control circuit to determine a power combination value, creates a delay profile based on the power combination value, and performs a finger assignment using the delay profile to output a despreading timing used in the weight calculation for the reception direction control.

2. The radio base station apparatus according to claim 1, further comprising a threshold value decider that makes a threshold value decision on the power addition values, wherein the path searcher determines the power combination value from the power addition values after the threshold value decision.

3. The radio base station apparatus according to claim 1, wherein the path searcher performs a following finger assignment using signals received by the reception direction control circuit with the plurality of reception weights respectively corresponding to the plurality of groups determined at the despreading timing.

4. A radio base station apparatus comprising:
   a reception weight calculator that divides a plurality of communication terminals into a plurality of groups and performs a weight calculation to determine a plurality of reception weights respectively corresponding to the plurality of groups;
   a reception direction control circuit that performs reception direction control of signals from the plurality of communication terminals using a plurality of directional patterns respectively corresponding to the plurality of groups formed based on the plurality of reception weights; and
   a path searcher that combines power addition values respectively corresponding to the plurality of directional patterns of the signals received from the reception direction control circuit to determine a power combination value, creates a delay profile based on the power combination value, and performs a finger assignment using the delay profile to output a despreading timing used in the weight calculation for the reception direction control.

5. A radio communication method comprising the steps of:
   dividing a plurality of communication terminals into a plurality of groups and performing a weight calculation to determine a plurality of reception weights respectively corresponding to the plurality of groups;
   performing, in a direction control circuit, reception direction control of signals from the plurality of communication terminals using a plurality of directional patterns respectively corresponding to the plurality of groups formed based on the plurality of reception weights; and
   combining power addition values respectively corresponding to the plurality of directional patterns of the reception direction controlled signals received from the direction control circuit in a path searcher to determine a power combination value, creating a delay profile based on the power combination value, and performing a finger assignment using the delay profile to output a despreading timing used in the weight calculation for the reception direction control.

* * * * *